(12) United States Patent
Conti et al.

(10) Patent No.: US 11,772,345 B2
(45) Date of Patent: Oct. 3, 2023

(54) PROCESS AND APPARATUS FOR HANDLING GREEN TYRES FOR BICYCLES

(71) Applicant: PIRELLI TYRE S.p.A., Milan (IT)

(72) Inventors: Davide Lupo Conti, Milan (IT); Bruno Lodi, Santo André (BR); Gian Luigi Bosio, Settimo Torinese (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 17/809,834

(22) Filed: Jun. 29, 2022

(65) Prior Publication Data
US 2022/0332068 A1 Oct. 20, 2022

Related U.S. Application Data

(62) Division of application No. 16/472,406, filed as application No. PCT/IB2017/057492 on Nov. 29, 2017, now Pat. No. 11,407,190.

(30) Foreign Application Priority Data

Dec. 28, 2016 (IT) .......................... 102016000131455

(51) Int. Cl.
B29D 30/36 (2006.01)
B29D 30/00 (2006.01)
(Continued)

(52) U.S. Cl.
CPC ....... B29D 30/0016 (2013.01); B29D 30/005 (2013.01); B29D 30/36 (2013.01);
(Continued)

(58) Field of Classification Search
CPC .... B29D 30/0016; B29D 30/20; B29D 30/22; B29D 30/2607; B29D 30/36;
(Continued)

(56) References Cited

U.S. PATENT DOCUMENTS 1,507,563 A * 9/1924 Abbott, Jr. ............. B29D 30/36
156/123
1,760,880 A 6/1930 Midgley
(Continued)

FOREIGN PATENT DOCUMENTS

CN 101316697 A 12/2008
EP 1 604 810 A1 12/2005
EP 1 954 478 4/2009

OTHER PUBLICATIONS

International Search Report form the European Patent Office in corresponding International Application No. PCT/IB2017/057492 dated Apr. 18, 2018.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A green tyre (2) for bicycles is built, comprising at least one carcass ply (4) having axially opposite end flaps (4*a*) engaged with respective bead cores (5) and a tread band (6) applied in a radially outer position around said at least one carcass ply (4). The green tyre (2) removed from the building drum, is profiled so as to translate the tread band (6) in a radially outer direction with respect to the bead cores (5), so as to impart a cross-sectional convex profile to the tyre (2) in a radially outer direction. The profiled tyre is engaged by means of a transfer member (31) while the tyre itself is mechanically restrained so as to maintain at least partly said cross-sectional convex profile in the radially outer direction.

14 Claims, 9 Drawing Sheets

(51) Int. Cl.
*B29D 30/08* (2006.01)
*B29D 30/06* (2006.01)
*B29D 30/26* (2006.01)

(52) U.S. Cl.
CPC ...... *B29D 30/08* (2013.01); *B29D 2030/0022* (2013.01); *B29D 2030/0038* (2013.01); *B29D 2030/0647* (2013.01); *B29D 2030/2614* (2013.01)

(58) Field of Classification Search
CPC .... B29D 2030/0022; B29D 2030/2614; B29D 2030/2635
See application file for complete search history.

(56) References Cited

U.S. PATENT DOCUMENTS

| | | | |
|---|---|---|---|
| 1,949,443 A | 3/1934 | Abbott, Jr. | |
| 2,007,909 A | 7/1935 | State | |
| 2,065,943 A | 12/1936 | Lerch | |
| 2,741,799 A | 4/1956 | Heston | |
| 3,212,951 A * | 10/1965 | Porter | B29D 30/58 156/126 |
| 3,824,048 A | 7/1974 | Getz | |
| 4,634,489 A | 1/1987 | Dopommier | |
| 4,667,574 A | 5/1987 | Felten | |
| 5,256,348 A | 10/1993 | Waller | |
| 5,380,384 A | 1/1995 | Tokunaga | |
| 2003/0034132 A1 | 2/2003 | De Graaf et al. | |
| 2010/0032079 A1* | 2/2010 | Marchini | B29D 30/0645 156/111 |
| 2010/0122775 A1 | 5/2010 | De Graaf et al. | |

OTHER PUBLICATIONS

Written Opinion of the International Searching Authority from the European Patent Office in corresponding International Application No. PCT/IB2017/057492 dated Apr. 18, 2018.
Notification of First Office Action dated Jan. 6, 2021, from China National Intellectual Property Administration, in counterpart Chinese Application No. 201780079387.6.

* cited by examiner

PROCESS AND APPARATUS FOR HANDLING GREEN TYRES FOR BICYCLES

This is a divisional application of U.S. application Ser. No. 16/472,406, filed Jun. 21, 2019, which is a U.S. National phase application based on International Application No. PCT/IB2017/057492, filed Nov. 29, 2017, which claims the priority of Italian Patent Application No. 102016000131455, filed Dec. 28, 2016; the content of each application is expressly incorporated in its entirety herein by reference.

The present invention relates to a process and an apparatus for handling green tyres for bicycles.

The building of a tyre for bicycles usually provides that one or more carcass plies are applied according to a cylindrical configuration around an outer surface of a building drum. A pair of bead cores are fitted or applied each around one of the axially opposite end flaps of the carcass ply. The end flaps are then turned up around the respective bead cores. A tread band is then applied around the carcass ply lying against the building drum, in an axially centred position with respect to the bead cores.

The mutual axial distance between the bead cores remains unchanged during the entire building process, including the application of the tread band. This process aspect represents a unique feature that distinguishes bicycle tyres from tyres for motor vehicles. For the latter, in fact, a mutual approach step of the bead cores is normally provided to shape the carcass structure according to a toroidal configuration in the coupling step with the belt structure.

Once the building has been completed, the built green tyre for bicycle is removed from the drum to be transferred in a vulcanisation press, where the tyre itself is subjected to a moulding and vulcanisation treatment aimed at determining the structural stabilisation thereof via cross-linking of the elastomeric material present therein, as well as optionally imprinting a desired tread design on the tread band.

The term "elastomeric material" is used to designate a composition comprising at least one elastomeric polymer and at least one reinforcement filler. Preferably, such a composition further comprises additives such as cross-linking agents and/or plasticisers. Due to the presence of the cross-linking agents, such a material can be cross-linked by heating so as to form the final manufactured article.

The terms "radial" and "axial" and the expressions "radially inner/outer" and "axially inner/outer" are used referring to the radial direction and the axial direction of the tyre, i.e. to a direction perpendicular to the axis of rotation of the tyre and a direction parallel to the axis of rotation thereof, respectively. The terms "circumferential" and "circumferentially" are instead used with reference to the annular development of the tyre.

The terms "low", "high", "below" and "above" identify the relative position of an element, such as a component of a tyre, a tyre, an apparatus, a device, etc., with respect to the ground or of one of said elements with respect to another element.

There essentially are at least two types of vulcanisation press, with single location and multiple location, respectively.

Single-location presses are provided with a single vulcanisation mould, normally made of two half-parts, housing a radially expandable vulcanisation bladder, fixed around a central support. The green tyre coming from the building line is picked up by an operator to be fitted around the vulcanisation bladder. The half-parts of the mould are closed and the bladder, previously mounted inside the vulcaniser, is inflated with pressurised steam or compressed air, or nitrogen or a mixture of the previous fluids, so as to press the tyre against the inner walls the mould and cause the vulcanisation thereof by heat. At the end of the vulcanisation, the mould half-parts are moved away from each other and the operator picks up the vulcanised tyre to replace it with a new green tyre to be vulcanised. This machine configuration, where each mould has a relative bladder previously mounted on the vulcaniser, can generally have up to three moulds stacked on top of each other.

There are also multiple-location vulcanisation presses, including multiple vulcanisation moulds stacked vertically on top of each other, generally up to a maximum of 7 moulds where, however, the bladder is not fixed on the vulcaniser. The use of multiple-location presses without fixed bladder or so-called central mechanism requires that an operator provides to introduce an expandable tubular chamber within each green tyre built to be treated. The operator then introduces each tyre coupled to the respective vulcanisation chamber between the half-parts of each vulcanisation mould, making sure that each chamber is connected to a steam feeding conduit, or compressed air, or nitrogen or a mixture of the previous fluids, by means of valve members provided for this purpose. At the end of the vulcanisation, the half-parts of each mould are moved away from each other and the operator picks up the vulcanised tyre to replace it with a new green tyre to be vulcanised and remove the vulcanisation chamber from each vulcanised tyre.

There are multiple-location presses in which the opening and closing cycles of the moulds and of vulcanisation are carried out simultaneously on all tyres loaded into the press. In other cases, a sequential opening of the moulds is carried out so as to perform the vulcanisation of the single tyres with interspersed times according to an on-going process.

The Applicant has noted that bicycle tyres, especially when green, are often without a structural consistency sufficient to allow the proper handling thereof by means of mechanical devices.

This is because bicycle tyres are often provided with bead cores in non-metallic material, for example in composite material based on natural or synthetic fibres (carbon, aramid, etc.) to allow the finished tyre to be folding. Moreover, as stated above, bicycle tyres are often devoid of reinforcement belt layers interposed between the carcass ply or plies and the tread band.

In particular, the Applicant has noted that once removed from the building drum, a green bicycle tyre tends to deform under the effect of internal stresses and of its own weight, and this is done randomly and uncontrollably both in circumferential direction, where the circular shape is lost due to the low resistance of the bead cores, and in the axial development direction due to the shrinkage of the materials or the weight of the components thereof.

For these reasons, bicycle tyres are often produced using mostly manual processes.

The Applicant has also felt that, in order to facilitate mechanised handling, it should be ensured that the green tyre can be picked up safely and reliably and repositioned with suitable accuracy for the purposes of processing.

The Applicant therefore deems it desirable to find a solution so that green tyres for bicycle can be restrained according to a substantially predetermined geometry to be handled substantially without further shape modifications, despite their tendency to take on a substantially random deformed development.

According to the present invention, the Applicant has found that if the pick-up of the green tyre for the transfer thereof is preceded by a profiling step suitable for making it take a shape compatible with the engagement by a transfer member designed for the handling thereof, restoring where necessary the shape thereof in the circumferential development, it is possible to allow the transfer of the same green tyre to the next process without modifications in the shape of the latter, thus obtaining a precise positioning in an apparatus which receives the same for the above process.

More in particular, according to a first aspect thereof, the invention relates to a process for handling green tyres for bicycle.

Preferably, it is provided to build a green tyre comprising at least one carcass ply having axially opposite end flaps engaged with respective bead cores and a tread band applied in a radially outer position around said at least one carcass ply.

Preferably, it is provided to arrange said green tyre around a profiling unit.

Preferably, it is provided to profile the green tyre by translating the tread band in a radially outer direction with respect to the bead cores, for imparting a cross-sectional convex profile to the tyre in a radially outer direction.

Preferably, it is provided to engage by means of a transfer member the tyre while the latter is mechanically restrained so as to maintain at least partly said cross-sectional convex profile in a radially outer direction.

According to a further aspect thereof, the present invention relates to an apparatus for handling green tyres for bicycle, each green tyre comprising at least one carcass ply having axially opposite end flaps engaged with respective bead cores and a tread band applied in a radially outer position on said carcass ply.

Preferably, a profiling unit is provided, operatively engageable with a green tyre and activated for translating said tread band in a radially outer direction with respect to the bead cores, for imparting a cross-sectional convex profile to said green tyre in a radially outer direction.

Preferably, a transfer member is provided, configured for engaging the green tyre while the latter is mechanically restrained by said profiling unit while maintaining at least partly said cross-sectional convex profile in a radially outer direction.

The Applicant believes that arranging a tyre thus profiled allows simplifying the automated pick up thereof by the transfer device. The imposition of a convex transverse development towards the exterior of the green tyre provides gripping areas having a predetermined position on the outer surface of the tyre itself, such as on the tread band along a median circumferential line located in the axial centreline plane of the tyre. Moreover, the Applicant believes that arranging the tyre thus profiled allows the subsequent introduction of the green tyre in the vulcanisation bladder without interference and contact of the central part of the green tyre with the bladder itself or with the flanges on which it is mounted, prior to occur the final correct placement of the green tyre into the respective mould.

The mechanical imposition to the total or partial maintenance of the cross-sectional convex profile in a radially outer direction also during the action of the transfer member improves the accuracy of the engagement of the tyre itself, overcoming the problems related to the springback effect of materials.

In at least one of the above aspects, the invention may further comprise one or more of the following preferred features.

Preferably, it is further provided to build the green tyre by: depositing said at least one carcass ply around a building drum; applying said bead cores at a predetermined mutual axial distance around the carcass ply; turning up the end flaps around the bead cores; and applying the tread band.

Preferably, the tread band is applied maintaining the mutual axial distance of the bead cores virtually unchanged.

Preferably, during the application of the tread band, an axially central portion of said at least one carcass ply, extending axially through a centreline plane equidistant from the bead cores, lies against the building drum.

Preferably, the tread band is applied on said at least one carcass ply before profiling the tyre.

Preferably, during the turning up, the end flaps are at least partially superimposed on each other.

Preferably, during the turning up, the turned up end flaps are joined in direct contact with each other.

Preferably, the tread band is applied in radial superimposition with respect to the turned up end flaps.

Preferably, the turned up end flaps are at least partly arranged in an axially inner position with respect to axially opposite edges of the tread band.

Preferably, the green tyre is built on a building drum, and the built green tyre is removed from the building drum before profiling the tyre itself.

Preferably, the tyre removed from the building drum takes a non-circular deformed development.

Preferably, the tyre removed from the building drum takes a cross-sectional profile substantially convex in a radially inner direction.

Preferably, an outer surface of the built tyre has portions of carcass ply directly exposed towards the external environment, extending between the axially outer edges of the tread band and the bead cores.

Preferably, during the profiling, the development of the tyre is restored to a circular configuration around a geometric axis of rotation thereof.

Preferably, during the profiling, the tyre is centred with an axis of rotation thereof coincident with a central geometric axis of a centring mandrel.

Preferably, profiling the green tyre comprises positioning the built tyre around a central geometric axis of a centring mandrel.

Preferably, profiling the green tyre comprises expanding a profiling member inside said tyre extending circumferentially around said central geometric axis.

The profiling action carried out from inside the tyre facilitates access to the outer surfaces thereof for the action of the transfer member and allows the central part of the green tyre to be moved away from the inextensible diameter of the bead cores.

Preferably, profiling the green tyre comprises expanding the profiling member from a radially contracted condition, in which it has at least one portion distant from a radially inner surface of the tyre, to a radially expanded condition, in which it operates against the radially inner surface of the tyre by exerting a thrust action in a substantially radial direction from the inside towards the outside.

Preferably, in the radially contracted condition, the profiling member has a maximum diameter smaller than a seating diameter of the tyre.

Preferably, an initial contact between the profiling member and the tyre takes place in the vicinity of an axial centreline plane of the tyre itself.

Preferably, said profiling member comprises an expandable membrane concentrically fixed to the central geometric axis.

The use of the expandable membrane facilitates a homogeneous and continuous distribution of the thrust actions exerted inside the tyre for profiling purpose.

Preferably, said profiling member comprises a plurality of sectors radially movable with respect to said central geometric axis.

Preferably, profiling comprises axially positioning the green tyre with an axial centreline plane thereof arranged in a predetermined position along the central geometric axis.

The achievement of a precise positioning of the tyre also along an axial direction is thus facilitated.

Preferably, profiling comprises positioning the green tyre with an axially outer edge thereof resting on an annular support element borne by the centring mandrel.

The annular support element is therefore adapted to provide a precise location for the axial positioning of the tyre.

Preferably, profiling further comprises contracting said profiling member previously expanded inside the tyre.

A mutual repositioning between the profiling member and the tyre is thus made possible.

Preferably, following the contraction, the profiling member is separated from a radially inner surface of the tyre.

Preferably, during the profiling, the expansion and contraction actions of the profiling member are cyclically repeated at least twice.

Repeated expansion and contraction cycles facilitate the correct profiling of the tyre without imposing excessive localised stresses and/or permanent deformations on the same.

Preferably, repeated expansion actions follow one another respectively with progressively increasing intensity.

Preferably, said repeated expansion actions follow one another within a time of less than about 30 seconds from each other.

Preferably, a first expansion action is carried out by imposing a relatively small expansion to the profiling member with respect to that imposed during a subsequent expansion action.

Preferably, a first expansion action is carried out by feeding operating fluid at a first pressure value in the expandable membrane.

Preferably, a second expansion action is carried out by feeding operating fluid at a second pressure value, higher than said first pressure value, in the expandable membrane.

Preferably, said first pressure value is in the range between about 10 KPa and about 150 KPa.

Preferably, the first expansion action is carried out by feeding the operating fluid at the first pressure value, for a time of between about 1 s and about 25 s.

Preferably, as a result of the first expansion action, the profiling member is brought to a semi-expanded condition, intermediate between a radially contracted condition and a radially expanded condition.

Preferably, said second pressure value is in the range between about 10 KPa and about 150 KPa.

Preferably, the second expansion action is carried out by feeding the operating fluid at the second pressure value, for a time of between about 1 s and about 25 s.

Preferably, the expansion of the profiling member takes place before engaging the tyre by said transfer member.

Preferably, the profiling member is brought at least once to the radially expanded condition to carry out at least partially the profiling, and then brought one last time to the radially expanded condition for the engagement of tyre by said transfer member.

Preferably, engaging the tyre with said transfer member comprises coaxially positioning a gripping device carried by the transfer member around the tyre.

Preferably, engaging the tyre with said transfer member comprises expanding the profiling member.

The positioning of the gripping member around the tyre is thus facilitated by axial insertion in the absence of mechanical interference with the profiled tyre.

Preferably, said gripping device comprises gripping elements circumferentially distributed around a gripping axis and operatively activated against a radially outer surface of said tread band.

Preferably, the gripping device is axially positioned for arranging the gripping elements in a predetermined axial gripping position with respect to the tyre.

A precise axial positioning with respect to the gripping element and the tyre engaged thereby is thus promoted.

Preferably, the profiling member is expanded after the gripping elements have reached the axial gripping position.

Preferably, the gripping elements are radially approached to the tread band after reaching said axial gripping position.

The positioning of the gripping member around the tyre is thus facilitated by axial insertion in the absence of mechanical interference with the profiled tyre.

Preferably, during the engagement of the tyre by the transfer member, the expansion of the profiling member to the radially expanded condition brings said tread band against said gripping elements.

Preferably, during the radial approach, the gripping elements come into contact against the tread band of the tyre while the profiling member is in the radially expanded condition.

Preferably, the tyre is engaged with the transfer member by means of attraction actions circumferentially distributed along a radially outer surface of the tread band.

The circumferentially distributed attraction actions facilitate the maintenance of the tyre in the profiled condition also after the disengagement thereof from the profiling member.

Preferably, said attraction actions are exerted by means of a pneumatic suction action.

Preferably, said pneumatic suction action is exerted through said gripping elements.

Preferably, the pneumatic suction action is activated when the tread band and said gripping elements are in mutual contact.

Preferably, the tyre retained by said attraction actions is removed from the centring mandrel and transferred to a subsequent working station.

Preferably, a building unit is further provided, comprising: a building drum; devices for applying said at least one carcass ply around the building drum; devices for applying said bead cores at a predetermined mutual axial distance around the carcass ply; devices for turning up the end flaps around the bead cores; devices for applying the tread band in a radially outer position around the carcass ply.

Preferably, the devices for applying the tread band are configured to apply the tread band at an axially central portion of said at least one carcass ply lying against the building drum.

Preferably, the devices for applying the tread band are configured to apply the tread band at an axially central portion of said at least one carcass ply, extending between said bead cores positioned according to said mutual axial distance on the building drum.

Preferably, said profiling unit comprises a centring mandrel having a central geometric axis.

Preferably, said profiling unit comprises a radially expandable profiling member extending circumferentially around said central geometric axis.

Preferably, the centring mandrel comprises a coupling shank arranged concentrically to the central geometric axis.

Preferably, said coupling shank has a truncated-cone upper end.

Preferably, the centring mandrel comprises a support plate bearing said profiling member.

Preferably, the coupling shank protrudes from an upper surface of the support plate.

Preferably, said profiling member comprises an expandable membrane.

Preferably, said expandable membrane is fixed around an outer circumferential surface extending concentrically to the central geometric axis.

Preferably, said profiling member comprises a plurality of sectors radially movable with respect to said central geometric axis.

Preferably, said central geometric axis is arranged transversely with respect to a horizontal geometric plane.

Preferably, said central geometric axis is oriented according to a vertical direction.

Preferably, said profiling unit further comprises axial positioning devices of the green tyre along the central geometric axis of the centring mandrel.

Preferably, said axial positioning devices comprise a circumferential support having a circumferential supporting surface which protrudes in a radially outer direction with respect to said profiling member, for supporting the tyre in supporting relation at an axially outer edge thereof.

Preferably, the circumferential support and the profiling member are reciprocally positionable along a direction parallel to said central geometric axis.

It is thus possible to easily adapt the profiling unit to the processing of tyres having different width.

Preferably, said circumferential support comprises a support ring slidably engaged with respect to the centring mandrel along said central geometric axis.

Preferably, said circumferential support comprises elastically movable sheets fixed to the support ring and circumferentially distributed around the central geometric axis for defining said circumferential supporting surface.

The sheets are adapted to deform elastically under the thrust exerted by the profiling member. The profiling member in fact pushes the sheets outwards when expanded, as these are made of harmonic steel, they return to their original position when pressure to the profiling member is removed.

It is therefore possible to place the circumferential support according to various axial positions, without any interference with the movements of the profiling member that may affect the efficiency of the system. This allows arranging the profiling unit for processing green tyres having a relatively small axial dimension, when the profiling member is partially inserted into the circumferential support.

Preferably, said sheets are spaced apart from the central geometric axis by a greater extent than a maximum radius of the profiling member with respect to the central geometric axis itself, at least when the profiling member is in the radially contracted condition.

It is therefore possible to prevent mechanical interference between the sheets and the profiling member, during the axial handling of the profiling member for adjustment purposes.

Preferably, each sheet comprises an attachment portion fixed to the support ring and extending away from the latter parallel to the central axis, and a supporting portion extending transversely from one end of the attachment portion.

Preferably, the transfer member comprises a handling group bearing a gripping device comprising gripping elements circumferentially distributed around a gripping axis.

Preferably, the gripping device bears a tailstock coaxial to said gripping axis and engageable in shape coupling with the coupling shank.

Preferably, said gripping members are operatively activated against a radially outer surface of said tread band.

Preferably, the gripping elements are radially movable with respect to the gripping axis.

Preferably, the gripping elements are radially movable on the action of a driving actuator activatable once the gripping device has been coaxially positioned around the centring mandrel.

Preferably, the gripping elements are radially movable between a rest condition, in which they are radially distanced from the central geometric axis, and a working condition in which they are radially approached with respect to the centring axis.

Preferably, the gripping elements comprise suction members activated to exert a pneumatic suction action against the green tyre engaged on the centring mandrel.

Preferably, sensor members are further provided to detect the presence of a tyre engaged around the profiling member.

It is thus possible to automatically enable the activation of the profiling unit and/or emit an alarm signal in case of incorrect positioning of the built tyre.

Preferably, said sensor members comprise an optical detector operating the profiling member to emit a presence signal when the tyre is interposed between the profiling member and the optical detector.

Further features and advantages will become more apparent from the detailed description of a preferred but non-exclusive embodiment of a process and apparatus for handling green tyres for bicycle according to the present invention. Such a description is given hereinafter with reference to the accompanying drawings, provided only for illustrative and, therefore, non-limiting purposes, in which:

FIGS. 1 to 4 schematically show cross-sectional views of some operating steps designed to build a green tyre for bicycle;

FIG. 5 shows a perspective bottom view of a handling apparatus according to the invention;

FIG. 6 schematically shows a perspective top view of a profiling unit forming part of the apparatus according to the present invention;

FIG. 7 schematically shows a cross-sectional view of the profiling unit with a green tyre fitted around a profiling member in contracted condition;

FIG. 8 schematically shows a cross-sectional view of the profiling unit with a green tyre fitted around a profiling member in semi-expanded condition;

Figure 12:
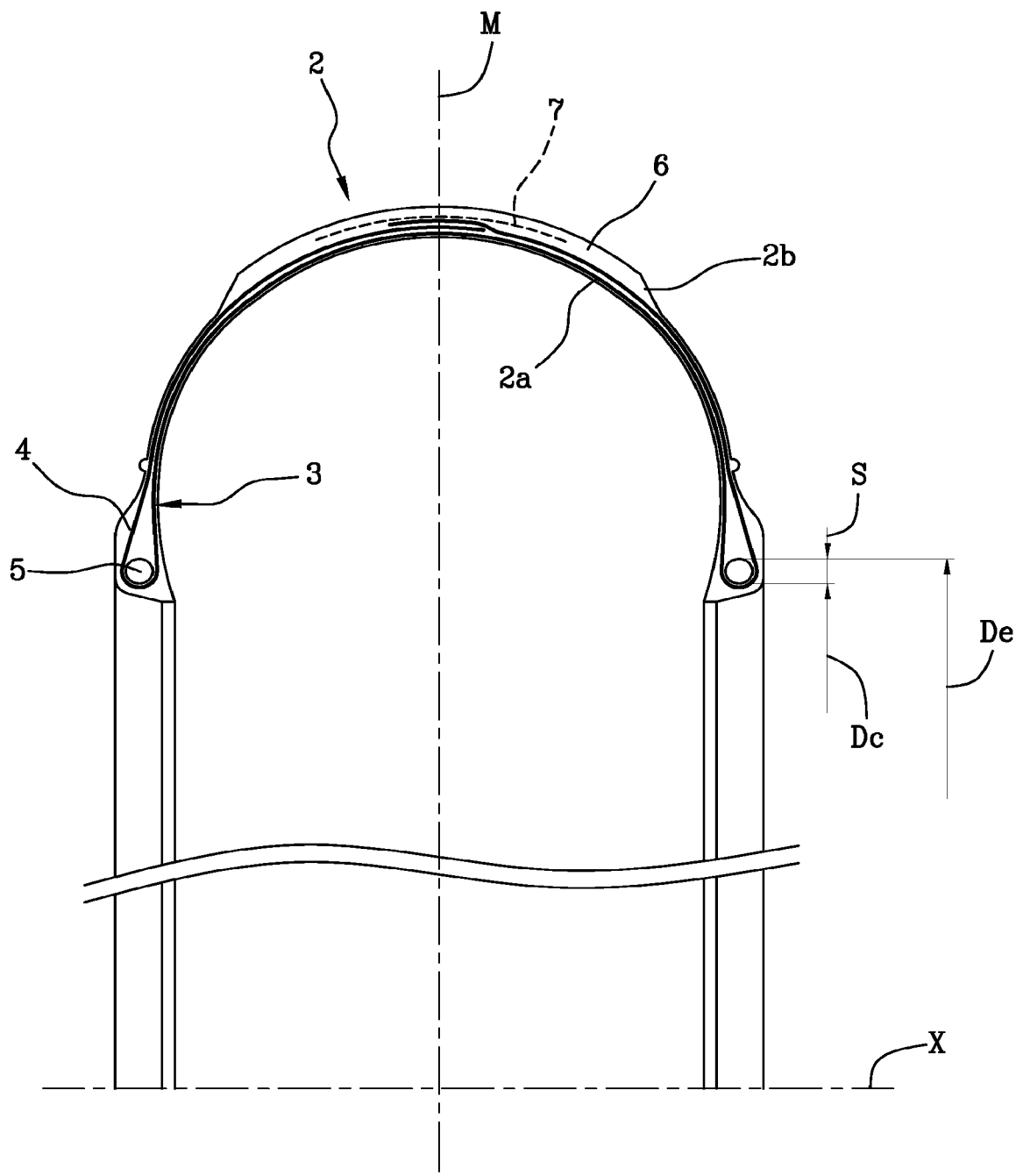

FIG. 12 schematically shows a radial section view of a finished tyre for bicycle.

An apparatus for handling green tyres for bicycle according to the present invention is globally denoted with reference numeral 1.

The present invention is designed for processing tyres 2 for bicycle, of the type schematically exemplified in FIG. 12, for example for use on road, track, mountain bikes, e-bikes, etc.

A radially inner surface 2a, substantially facing towards a geometric axis of rotation "X" of tyre 2, and a radially outer surface 2b substantially facing away from the geometric axis of rotation "X", can be identified in tyre 2.

Tyre 1 for bicycle has a carcass structure 3 comprising at least one carcass ply 4 having mutually parallel cords embedded in an elastomeric matrix.

Axially opposite end flaps 4a of the carcass ply or plies 4 are engaged to respective bead cores 5, that is, annular anchoring structures integrated in the regions usually identified by the name of "beads" at which the mechanical engagement between tyre 2 in use conditions and a respective mounting rim takes place.

A tread band 6, made of elastomeric material, is applied in a radially outer position with respect to the carcass structure 3.

Preferably, at least two layers of cords having a cross pattern, respectively, can be identified in the carcass structure 3. The cords belonging to each layer have an inclined development according to a predetermined angle, approximately between about 35° and about 65° with respect to a circumferential development direction of tyre 2. For example, the presence of two carcass plies 4 may be provided, radially superimposed on top of each other, each with the respective cords extending along an inclined direction with respect to the circumferential development of tyre 2 and according to an inclined orientation with respect to the cords belonging to the other carcass ply 4. Alternatively, as shown in FIG. 12, a single carcass ply 4 may be provided, the end flaps 4a whereof, turned up around bead cores 5, extend at least up to an axial centreline plane "M" of tyre 2, so as to define each a further radially outer layer of cords having crossed orientation with respect to the cords present in the radially inner layer.

Unlike the tyres typically designed to be used on motor vehicles, tyre 2 for bicycle is generally devoid of a belt structure, that is, of reinforcement belt layers radially interposed between the carcass structure 3 and the tread band 6. In tyres for motor vehicles, these belt layers contribute to increasing the structural strength of tyre 2 and to stabilising the geometry thereof, especially in the crown region, i.e. in the radially outer regions closer to the tread band 6.

In tyre 2 for bicycle, however, at least one circumferential protective layer 7 may be provided, interposed between the tread band 6 and the carcass structure 3. Where present, said at least one circumferential protective layer 7, the task whereof is essentially to protect tyre 2 from puncture, may have a textile structure or be made in the form of continuous layered tape of synthetic material, and preferably has a thickness not larger than about 0.5 mm, preferably not smaller than about 0.2 mm. Unlike a real belt structure, the circumferential protective layer or layers optionally present in tyre 2 for bicycle do not significantly influence the structural strength, geometric stability and/or dynamic behaviour of tyre 2 itself.

Preferably, on the radially outer surface 2b of tyre 2 for bicycle, portions of carcass ply 4 directly exposed towards the external environment can be identified between the axially outer edges of the tread band 6 and the bead cores 5. Tyre 2 for bicycle is in fact typically not provided with sidewalls, i.e. layers of elastomeric material applied laterally outside the carcass structure 3, each extending between one of the beads and the respective axially outer edge of the tread band.

In tyre 2 for bicycle, thickness "S" of the bead core 5 corresponds to a half of the difference between an outer circumferential diameter "De" and the seating diameter "Dc" of bead core 5 itself. As schematised in FIGS. 1 to 4, the building of tyre 2 for bicycle in fact provides that, using suitable application devices (not shown) forming part of a building unit, the carcass ply or plies 4 are deposited according to a cylindrical configuration, such as by wrapping around an outer surface of a building drum 9.

By means of bead core application devices (not shown), a pair of bead cores 5, for example made of composite material based on natural or synthetic fibres and/or metallic material, is applied at a fixed mutual axial distance "D", each around one of the axially opposite end flaps 4a of the carcass ply 4.

In particular, in the example shown, it is provided that each bead core 5, previously made in the form of finished component, is first fitted around the carcass ply or plies 4 in an axial position corresponding to a circumferential recess 10 formed on the building drum 9 A slight radial expansion of the building drum 9, for example by lever mechanisms forming part of said bead core application devices, causes the application of the bead cores 5 against the carcass ply or plies 4, each at the respective circumferential recess 10.

Alternatively, the bead core application devices may be configured to make each bead core 5 directly on the building drum 9, wrapping one or more continuous cords around the carcass ply or plies 4 according to a plurality of coils axially juxtaposed and/or radially superimposed on each other.

Turning up devices (not shown) operating at the building drum 9 then turn up the end flaps 4a of the carcass plies 4 around the respective bead cores 5. During the turning up, the end flaps 4a may be at least partially superimposed on each other and optionally joined in mutual direct contact.

Tread band application devices (not shown) aid the application of a tread band 6 around the carcass ply 4, in an axially centred position with respect to the bead cores 5. The tread band 6 may be applied in radial superimposition with respect to the turned up end flaps 4a. Once the application has been completed, the turned up end flaps 4a may therefore be partly arranged in an axially inner position with respect to axially opposite edges of the tread band.

On occurrence, the application of the tread band 6 may be preceded by the application of said at least one circumferential protective layer 7.

Figure 1:
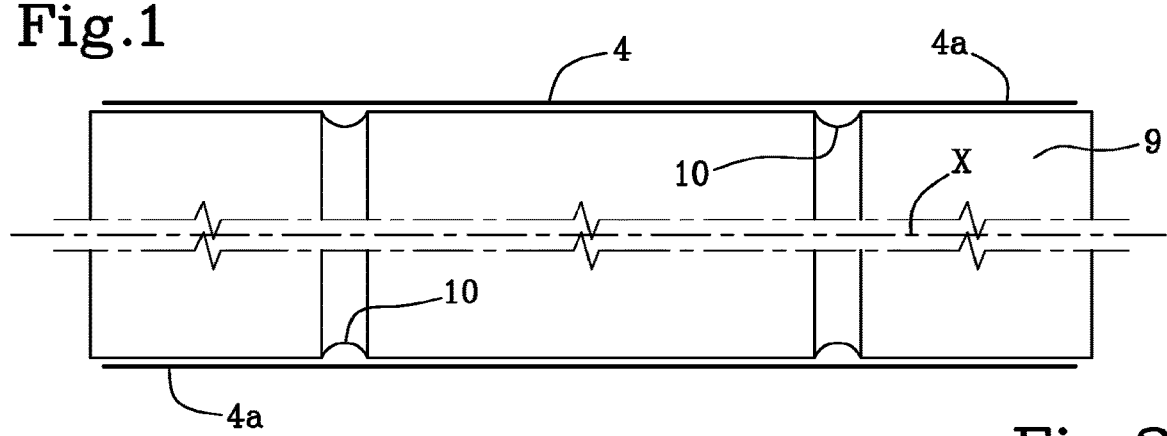
Figure 2:
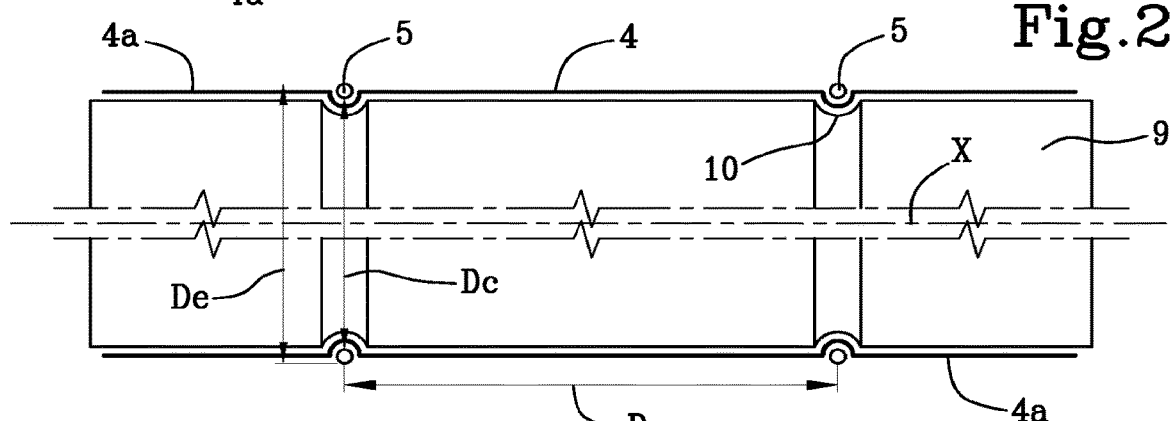
Figure 3:
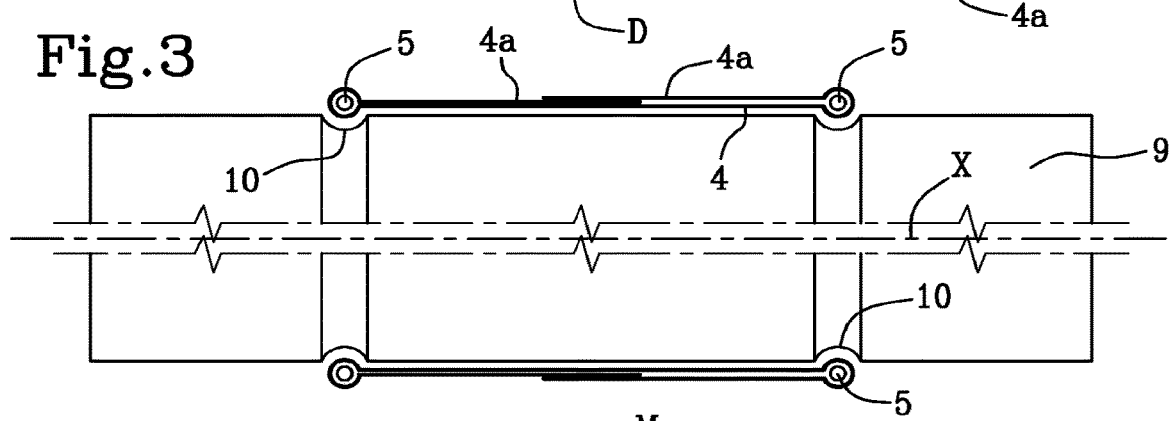
Figure 4:
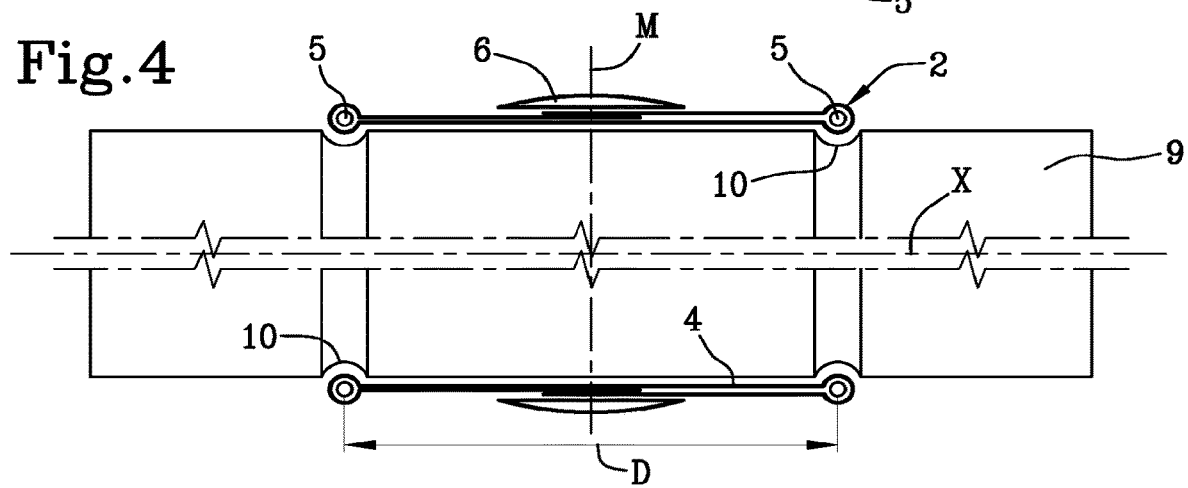
Figure 5:
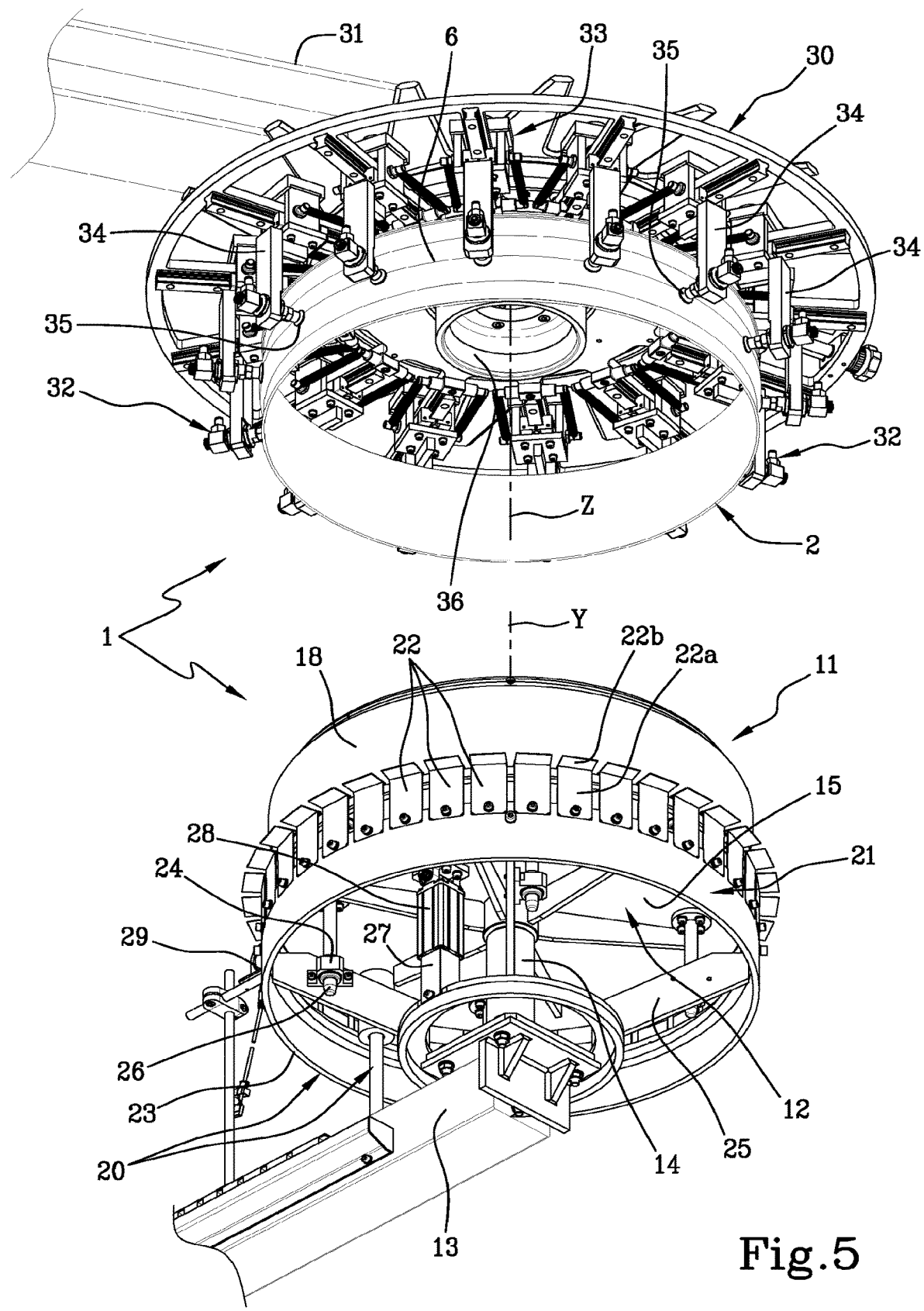
Figure 6:
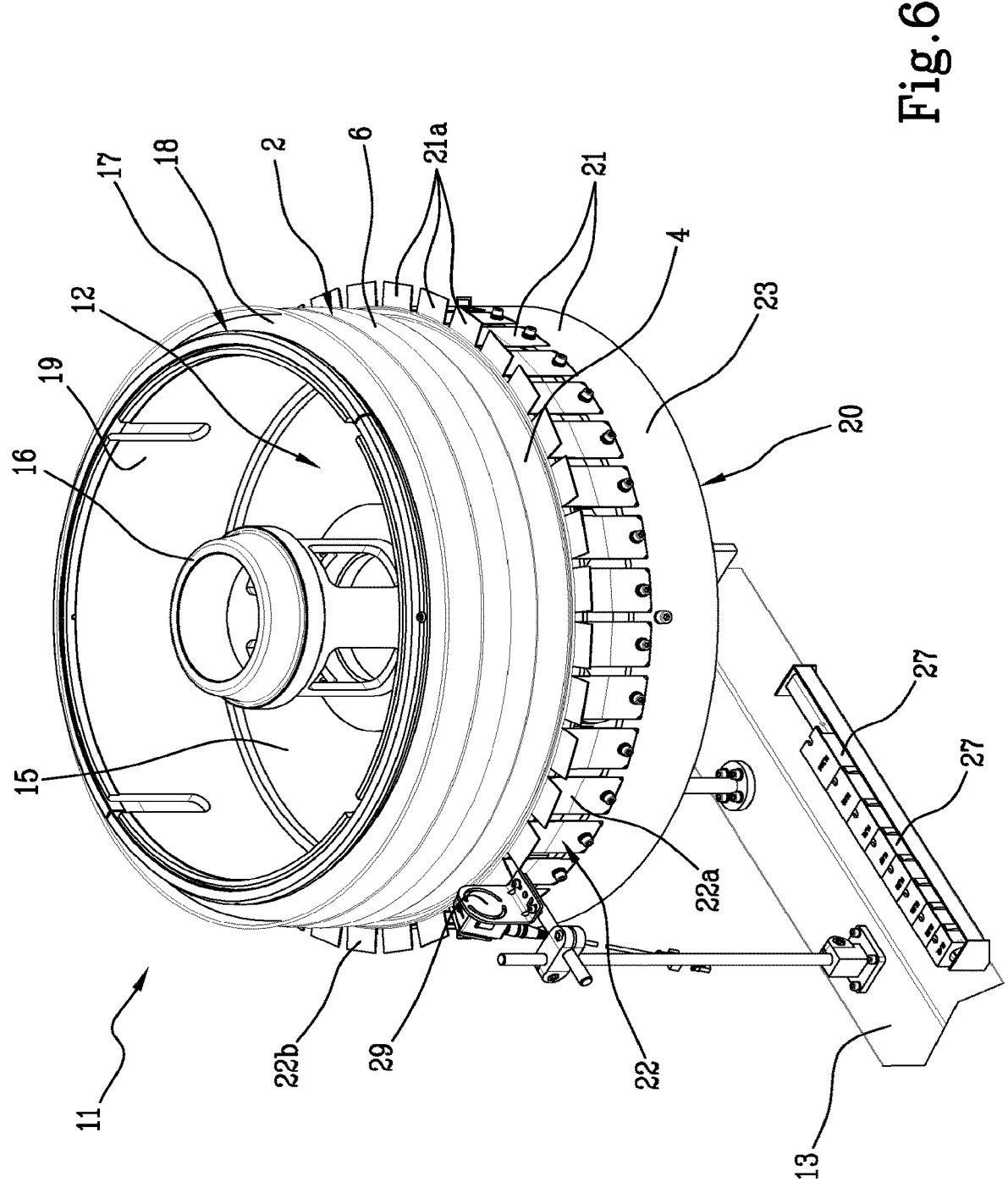

During the application of the tread band 6, an axially central portion of said at least one carcass ply 4, extending axially through an axial centreline plane "M" equidistant from the bead cores 5, lies against the building drum 9 (FIG. 4).

The tread band 6 is preferably applied maintaining the mutual axial distance "D" of the bead cores 5 virtually unchanged. More in particular, the mutual axial distance "D" between the bead cores 5 preferably remains unchanged during the entire building process, including the application of the tread band 6.

Once the building has been completed, the green tyre 2 is removed from the building drum 9 to be subjected to other process steps, for example to be transferred to a vulcanisation press.

To this end, the building drum 9 is radially contracted so as to facilitate the axial removal of the built tyre 2. Being devoid of belt structure and having generally bead cores 5 made from natural or synthetic fibres (carbon, aramid, etc.), tyre 2 for bicycle tends to deform spontaneously or very easily, for example under the effect of its own weight, as soon as it is removed from the building drum 9. In other words, upon removal from the building drum 9, tyre 2 loses its shape with circular development, taking a deformed development in a random and uncontrolled manner.

Moreover, any residual elastic tensions resulting for example from the radial expansion imposed during the application of the bead cores 5 induce the carcass ply or plies 4 to resume their original diameter, especially at the axially central portion. As a result, tyre 2 initially built according to a cylindrical shape, tends to take a cross-sectional profile substantially convex towards a radially inner direction.

The present invention aims to allow a reliable handling of the built tyre 2 for bicycle, for the transfer thereof to a vulcanisation press or other working station subsequent to said building unit.

To this end, a profiling unit 11 is provided, comprising a centring mandrel 12 having a central geometric axis "Y", preferably oriented transversely to a horizontal plane, for example according to a direction perpendicular thereto (vertical).

The centring mandrel 12 comprises a support structure 13 supporting a central upright 14 to which a support plate 15 is fixed, preferably circular in shape, having a peripheral edge extending concentrically on the central geometric axis "Y".

A coupling shank 16 tubular in shape, having a truncated-cone upper end, is preferably fixed on an upper surface of the support plate 15, concentrically to the central geometric axis "Y".

The centring mandrel 12 is operatively coupled to a radially expandable profiling member 17, extending circumferentially around the central geometric axis "Y" and preferably arranged peripherally on the upper surface of the support plate 15.

Preferably, the profiling member 17 comprises an expandable membrane 18 extending around the central geometric axis "Y".

The expandable membrane 18 is preferably fixed around a support collar 19 fixed to the support plate 15 concentrically to the central geometric axis "Y". The expandable membrane 18 is adapted to be inflated through the controlled introduction of air or other operating fluid under pressure through one or more passages formed, for example, through the support collar 19, to radially expand away from the central geometric axis "Y".

In a possible alternative embodiment not shown, the profiling member 17 may optionally comprise, in addition to or in replacement of the expandable membrane 18 and the support collar 19, a plurality of sectors radially movable with respect to said central geometric axis "Y".

The profiling unit 11 is adapted to operatively engage the built green tyre 2, which can be fitted around the profiling member 17, for example by manual intervention of an operator.

The profiling unit 11 is further preferably provided with axial positioning devices 20 of the green tyre 2 along the central geometric axis "Y" of the centring mandrel 12.

Such axial positioning devices 20 may for example comprise a circumferential support 21 having at least one circumferential supporting surface 21a concentric to the central geometric axis "Y" and protruding in a radially outer direction with respect to said profiling member 17, for supporting tyre 2 in supporting relation at an axially outer edge thereof, for example defined by one of the beads arranged inferiorly.

The circumferential support 21 and the centring mandrel 12 are mutually positionable along a direction parallel to the central geometric axis "Y", so as to facilitate the adaptation of the profiling unit 11 to the processing of tyres 2 having respectively different widths.

To this end, it may for example be provided that the circumferential supporting surface 21a of the circumferential support 21 is defined by a plurality of elastically movable sheets 22 peripherally borne by a support ring 23 so as to be circumferentially distributed around the central geometric axis "Y". Each sheet 22 may for example comprise an attachment portion 22a fixed to the support ring 23 and extending away from the latter parallel to the central geometric axis "Y", and a supporting portion 22b extending transversely from one end of the attachment portion 22a, in a spaced apart position with respect to the support ring 23.

Preferably, the support ring 23 engages the centring mandrel 12 slidably along a direction parallel to the central geometric axis "Y".

To this end, the circumferential support 21 may be provided with one or more runners 24, for example borne by a radial structure 25 integral with the support ring 23. Runners 24 are operatively engaged along respective guide rods 26 protruding inferiorly from the support plate 15 of the centring mandrel 12. An interchangeable calibrated insert 27, removably engaged between the radial structure 25 and an abutment 28 inferiorly borne by the support plate 15, stops the descent of the centring mandrel 12 at a predetermined height with respect to the circumferential support 21. The availability of a plurality of calibrated inserts 27 may be provided, having different dimensions and selectively usable as a function of the axial dimension of the green tyre 2 being processed.

The presence of the correct calibrated insert 27, pre-selected as a function of the axial dimension of the tyres being processed, makes the green tyre 2 fitted around the centring mandrel 12, coming into contact with the circumferential supporting surface 21a, arrange itself with respect to the profiling member 17 in a predetermined axial position along the central geometric axis "Y". More precisely, the green tyre 2 is stopped and supported in a position such that the axial centreline plane "M" thereof coincides with an axial centreline plane "M" of the expandable membrane 18, or other type of profiling member 17.

Preferably, sheets 22 are spaced apart from the central geometric axis "Y" by a greater extent than a maximum radius of the profiling member 17 with respect to the central geometric axis "Y" itself, at least in the radially contracted condition. It is therefore possible to prevent mechanical interference between sheets 22 and the profiling member 17, during a mutual axial handling thereof.

The profiling member 17 is adapted to be activated, for example by introducing operating fluid in the expandable membrane 18, when the green tyre 2, previously fitted around the profiling member 17, is supported by the circumferential supporting surface 21a.

To this end, it may be provided that the activation control of the profiling member 17 takes place by an electronic control unit (not shown), upon receipt of an enabling signal emitted by sensor members 29 designed to detect the presence of tyre 2 around the profiling member 17 itself. Such sensor members 29 may for example comprise an optical detector oriented towards the profiling member 17. The optical detector is configured to emit a presence signal when tyre 2 is interposed between the profiling member 17 and the optical detector itself.

Figure 7:
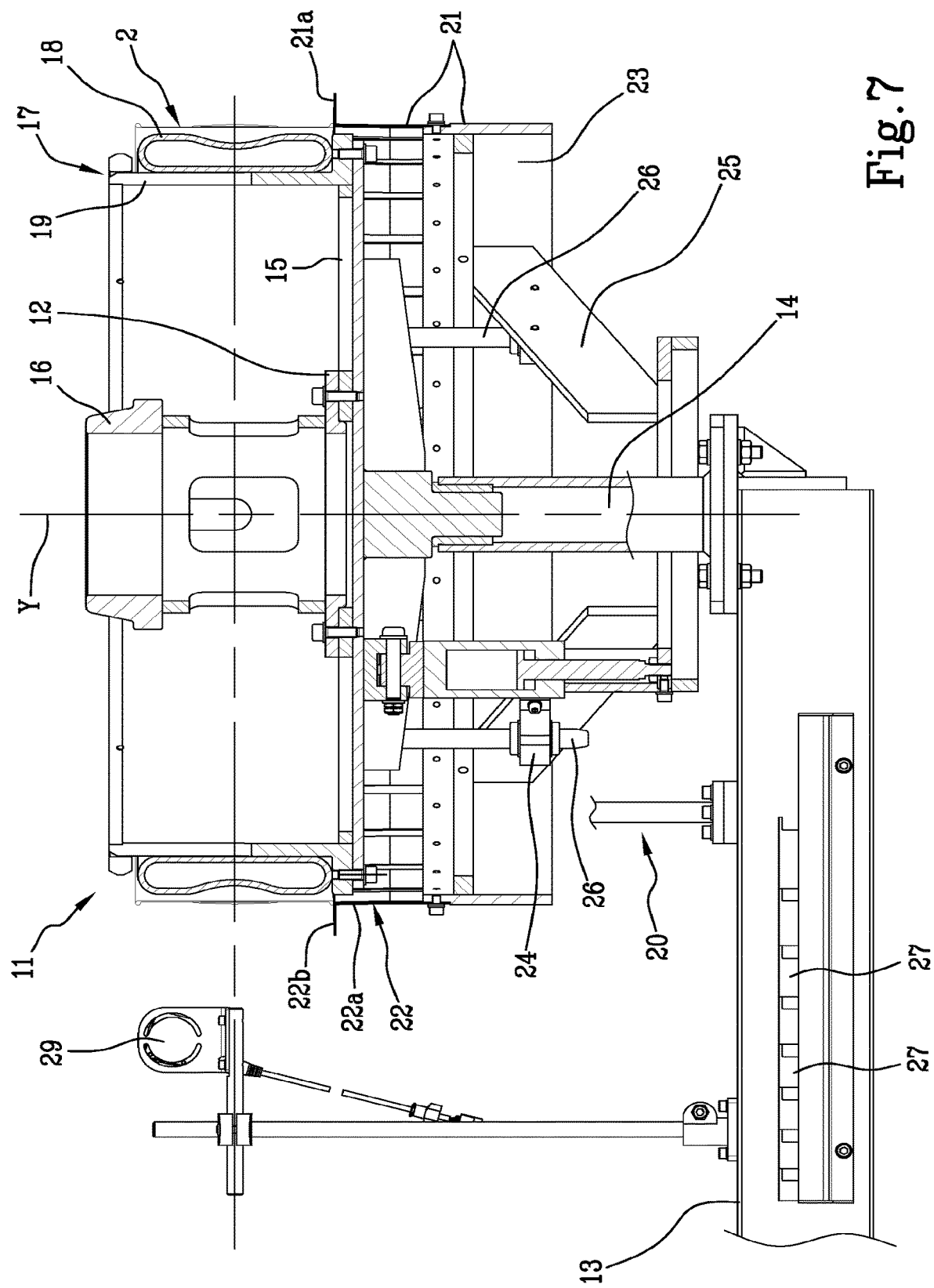
Figure 10:
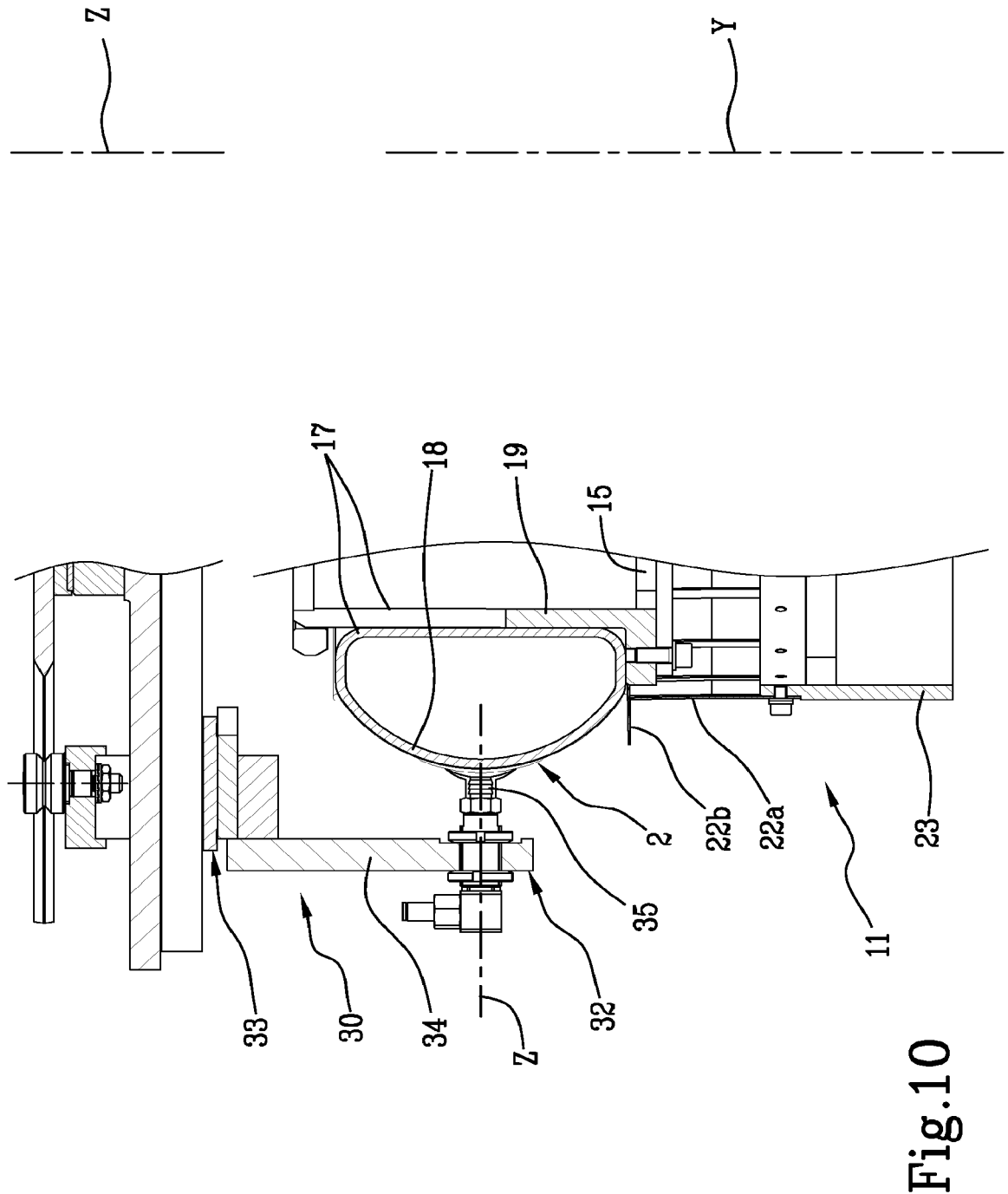
FIG. 10 shows the detail in FIG. 9 during the engagement of the green tyre with the gripping device.

The expandable membrane 18 or other profiling member 17 is consequently expanded from a radially contracted condition (FIG. 7) to a radially expanded condition (FIG. 10). Preferably, in the contracted condition, the profiling member 17 has a maximum diameter smaller than the seating diameter "Dc", so as to have at least one portion distant from the radially inner surface 2a of the built tyre 2. In the expanded condition, the profiling member preferably has, at least in the vicinity of the axial centreline plane "M", a maximum diameter greater than the seating diameter, so as to operate against the radially inner surface 2a of tyre 2, exerting a thrust action in a substantially radial direction from the inside towards the outside of tyre 2 itself. On the effect of such a thrust action, the green tyre 2 is therefore subjected to a restoration of the development so as to take again a circular configuration around the geometric axis of rotation X. At the same time, tyre 2 is centred with the geometric axis of rotation "X" thereof coincident with the central geometric axis "Y" of the centring mandrel 17 and of the profiling member 17.

The expansion of the expandable membrane 18, moreover, tends to translate the tread band 6 towards a radially outer direction with respect to the bead cores 5, so as to impart a cross-sectional convex profile to the green tyre 2 towards a radially outer direction.

In order to facilitate the profiling of tyre 2 in the manner described above, the initial contact between the expandable membrane 18 and the built tyre 2 preferably takes place in the vicinity of the axial centreline plane "M" of tyre 2 itself.

Since the green tyre 2 positioned around the profiling member 17 may have a significantly deformed configuration, it is preferable that the profiling of tyre 2 itself is not carried out by a single expansion action, but by two or more expansion actions cyclically repeated and alternating with respective contraction actions. It may further be provided that such cyclically repeated expansion actions follow one another respectively with progressively increasing intensity.

Figure 8:
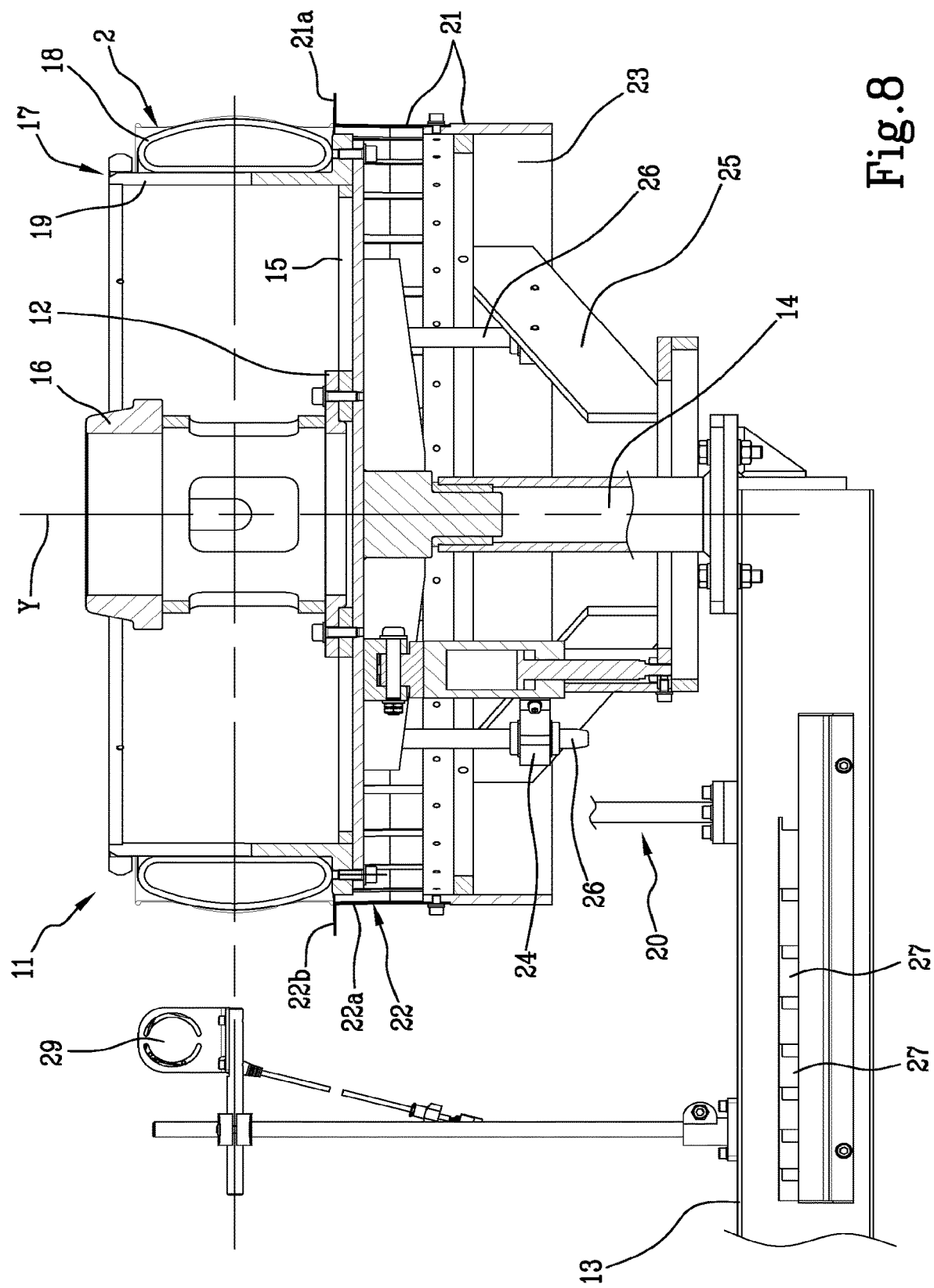

More in particular, a first expansion action may be carried out by imposing a relatively small expansion to the profiling member 17 with respect to that imposed during a subsequent expansion action. In the example shown, to this end it may be provided that the first expansion action is carried out by feeding operating fluid in the expandable membrane 18 at a first pressure value, suitable for determining a sufficient circumferential stretching of tyre 2. In particular, the tyre may thus be stretched according to a circular configuration coaxially to the central geometric axis "Y". For example, the first expansion action may be carried out by feeding the operating fluid at a pressure of between about 10 KPa and about 150 KPa, for a time indicatively of between about 1 s and about 25 s. As a result of the first expansion action, the profiling member 17 is preferably brought to a semi-expanded condition, intermediate between the contracted condition and the expanded condition (FIG. 8).

The operating fluid is then discharged from the expandable membrane 18 to determine a first contraction, so as to obtain the detachment, preferably complete, from the inner surface of tyre 2.

Immediately after the contraction, indicatively within a time not exceeding about 30 s, operating fluid is again introduced in the expandable membrane 18 at a higher pressure than the first value, so as to determine a second expansion action and subsequent profiling of tyre 2. For example, the second expansion action may be carried out by feeding the operating fluid at a pressure of between about 10 KPa and about 150 KPa, for a time indicatively of between about 1 s and about 25 s. As a result of the second expansion action, the profiling member 17 can be brought to the expanded condition.

Since the green tyre 2 is already pre-profiled due to the first expansion action, the action of the expandable membrane 18 during the second expansion action may be more uniform, so as to facilitate the profiling of tyre 2 without causing distortions due to localised stresses.

On occurrence, more than two expansion action interspersed with respective contraction actions may be provided.

After or concurrently with the execution of the profiling action, the green tyre 2 is adapted to be engaged by a gripping device 30 borne by a transfer member 31, which removes it from the profiling unit 11 to bring it to a subsequent working station, such as a vulcanisation press.

Preferably, the transfer member 31, for example comprising a robotic arm, preferably of the anthropomorphic type with at least six axes, or other handling unit, is configured to engage the green tyre 2 by the gripping device 30, while tyre 2 itself is mechanically retained so as to maintain said cross-sectional convex profile in a radially outer direction.

The gripping device 30 preferably comprises gripping elements 32 circumferentially distributed around a gripping axis "Z" and defining each a gripping point of tyre 2.

Figure 9:
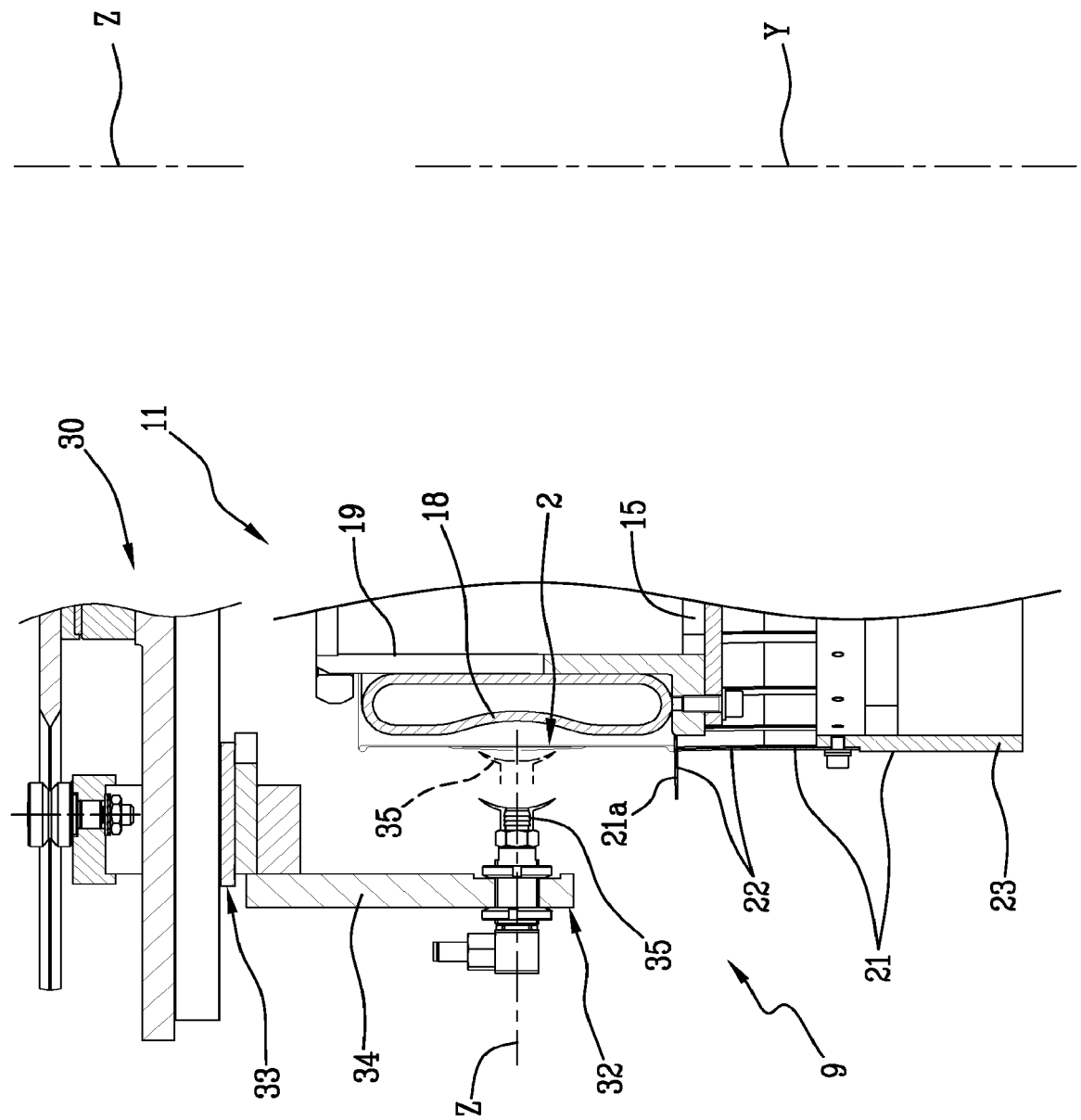
FIG. 9 shows the detail in FIG. 7 during the introduction of a gripping device of the green tyre.
Figure 11:
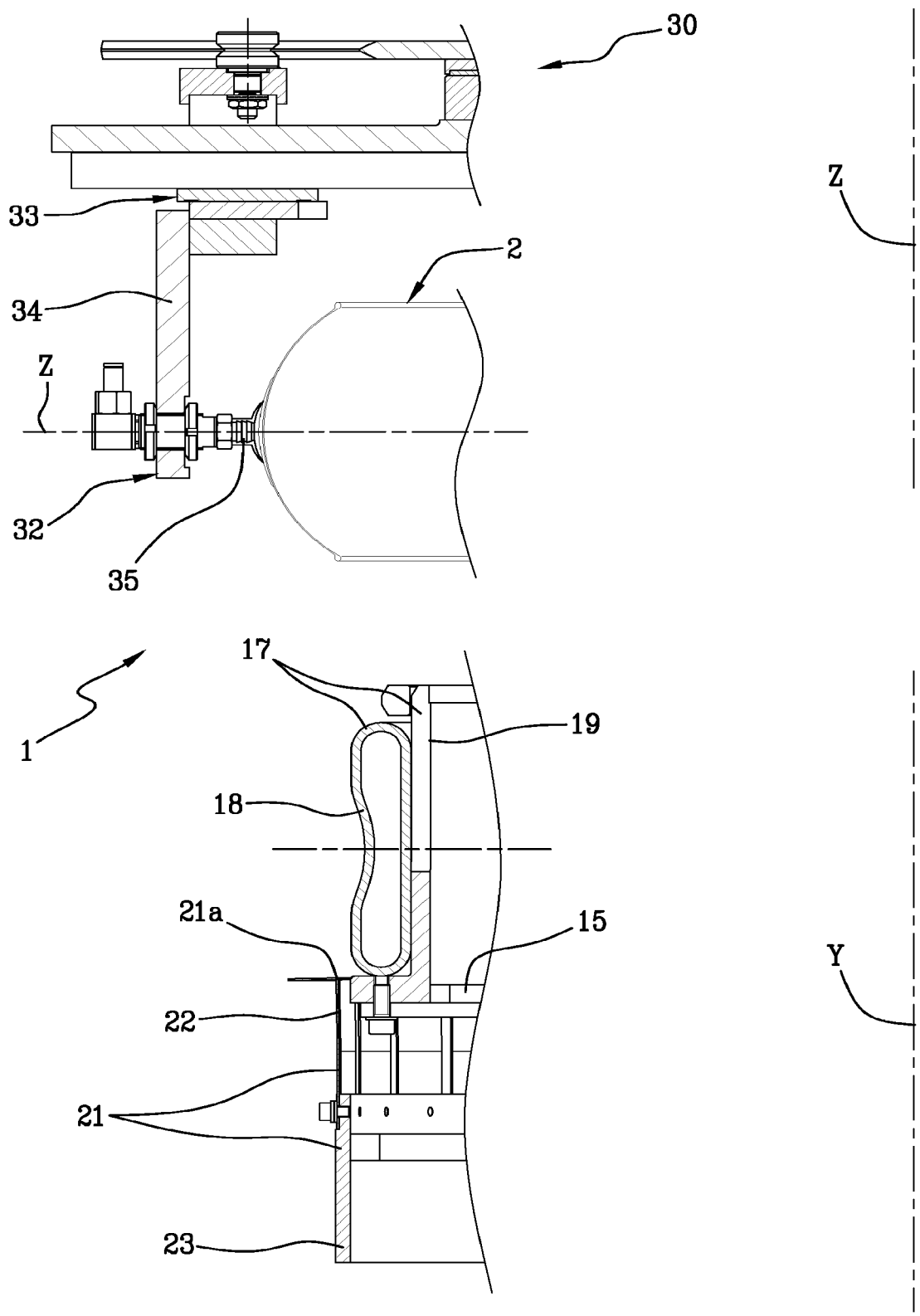
FIG. 11 shows the green tyre engaged with the gripping device and removed from the profiling unit.

On the action of at least one driving actuator (not shown in the drawings), the gripping elements 32 are radially movable with respect to the gripping axis "Z", between a rest condition, in which they are radially distanced with respect to the central geometric axis "Y" (FIG. 9), and a working condition in which they are radially approached with respect to the central geometric axis itself (FIGS. 10 and 11).

It may be provided that a single driving actuator operates simultaneously on multiple gripping elements 32, preferably all, through a handling mechanism 33 configured to radially move them in a simultaneous and synchronized manner. To this end, it may be provided that the activation control of the gripping elements 32 takes place by an electronic or pneumatic control unit (not shown).

Each gripping element 32 may for example comprise a support 34, such as plate-shaped, extending parallel to the gripping axis "Z" and having an upper end constrained to the handling mechanism 33 and a lower end bearing a suction member 35 to which a suction conduit is connected. The suction member 35 can be activated by the effect of a pneumatic suction produced through a suction conduit.

The transfer member 31 coaxially places the gripping device 30 above the profiling unit 11 with the gripping elements 32 arranged in the rest condition.

A descent translation of the gripping device 30 is then determined along the gripping axis "Z", to obtain the mutual engagement between the coupling shank 16 and a tailstock 36 counter-shaped thereto, coaxially borne by the gripping device 30. The engagement of tailstock 36 with the coupling shank 16 defines a shape coupling configured to determine a precise alignment of the gripping device 30 with the gripping axis "Z" thereof coaxially aligned with respect to the central geometric axis "Y" of the profiling member 17 and thus, with respect to the geometric axis of rotation "X" of the green tyre 2. The engagement of tailstock 36 with the coupling shank 16 also causes the stop of the gripping device 30 in a predetermined axial gripping position with respect to the profiling member 17. As exemplified in FIG. 9, in the axial gripping position, the gripping points defined each concentrically by the respective suction member 35 are arranged in a relation of substantial coplanarity with the axial centreline plane "M" of the profiling member 17 and of the green tyre 2 fitted around it.

Preferably, the lowering towards the axial gripping position is carried out by maintaining the gripping elements 32 in the rest condition, thus reducing the risk of sliding and/or interference against the green tyre 2. Upon reaching the axial gripping position, the above driving actuator can be activated, which causes the translation of the gripping elements 32 towards the operating condition, approaching the tread band 6 of tyre 2.

Moreover, it is further preferably provided that the lowering of the gripping device 30 towards the axial gripping position is carried out after the beginning of the profiling operation of tyre 2, but before such a profiling operation has been completed. More in particular, such a lowering takes place for example when the profiling member 17 has been returned to the contracted condition after carrying out at least one expansion action.

Upon reaching the operating condition, the gripping elements 32 may be still slightly distanced with respect to tyre 2. In this case, a last expansion action imposed by the profiling member 17 brings the tread band 6 against the suction members 35 of the gripping elements 32.

Alternatively, it may be provided that the radial contraction of the gripping elements 32 takes place when the profiling member 17 has already reached the expanded condition following the last expansion action. In this case, upon reaching the operating condition, the gripping elements 32 come into contact with tyre 2, bringing the respective suction members 35 against the outer surface of the tread band 6 while the profiling member 17 is in the expanded condition.

In both cases, the pneumatic suction effect produced by the suction members 35 makes the gripping elements 32 be operatively activated against a radially outer surface of the tread band 6, exerting attraction actions directed in radial distancing of the geometric axis of rotation "X" of tyre 2, and distributed along the whole circumferential development of the latter.

The engagement of tyre 2 to the transfer member 31 can thus be obtained while tyre 2 itself is still mechanically retained by the profiling member 17, which imposes at least partially retaining said cross-sectional convex profile in a radially outer direction.

Once the engagement has taken place, the profiling member 17 can be returned to the radially contracted condition, so that tyre 2 can be axially removed from the profiling unit 11 by the effect of the lifting of the gripping device 30. The attraction actions exerted on the tread band 6 by the gripping elements 32 mechanically retain tyre 2, thus ensuring the maintenance of the latter in a condition very close to the profiled one even after the disengagement thereof from the profiling member 17. Tyre 2 is therefore adapted to retain a stable geometrical shape for the correct transfer to the next working station. In particular, retaining the profiling condition favours the correct engagement of tyre 2 with the members designed to the treatment thereof in the vulcanisation press or other subsequent working station.

The invention claimed is:

1. An apparatus for handling green tyres for a bicycle, wherein each green tyre comprises at least one carcass ply having axially opposite end flaps engaged with respective bead cores and a tread band applied in a radially outer position on the carcass ply, comprising:
    a profiling unit operatively engageable with the green tyre and activated for translating the tread band in a radially outer direction with respect to the bead cores to impart a cross-sectional convex profile to the green tyre in a radially outer direction, and
    a transfer member configured for engaging the green tyre while the green tyre is mechanically restrained by the profiling unit while at least partly maintaining the cross-sectional convex profile in a radially outer direction;
    wherein the profiling unit comprises: a centring mandrel having a central geometric axis ("Y"); and a radially expandable profiling member fixed around a support collar;
    wherein the radially expandable profiling member extends circumferentially around the central geometric axis ("Y"),
    wherein, via an introduction of operating fluid through one or more passages formed through the support collar, the radially expandable profiling member is radially expandable from a radially contracted condition, in which the radially expandable profiling member has at least one portion distant from a radially inner surface of the tyre, to a radially expanded condition, wherein the radially expandable profiling member operates against the radially inner surface of the tyre by exerting a thrust action in a substantially radial direction from the inside towards the outside;
    wherein, via a discharging of the operating fluid, the radially expandable profiling member is radially contracted towards the contracted condition;
    the apparatus further comprising an electronic control unit configured for expanding and contracting of the radially expandable profiling member, that is cyclically repeated at least twice within less than about 30 seconds, with progressively increasing of a pressure value of the operating fluid introduced in the radially expandable profiling member.

2. The apparatus as claimed in claim 1, wherein the centring mandrel comprises a coupling shank arranged concentrically to the central geometric axis ("Y").

3. The apparatus as claimed in claim 2, wherein the profiling member comprises an expandable membrane.

4. The apparatus as claimed in claim 3, wherein the profiling member comprises a plurality of sectors radially movable with respect to the central geometric axis ("Y").

5. The apparatus as claimed in claim 4, wherein the central geometric axis ("Y") is arranged transversely with respect to a horizontal geometric plane.

6. The apparatus as claimed in claim 5, wherein the profiling unit further comprises axial positioning devices of the green tyre positioned along the central geometric axis ("Y") of the centring mandrel.

7. The apparatus as claimed in claim 6, wherein each axial positioning device comprises a circumferential support with a circumferential supporting surface protruding in a radially outer direction with respect to the profiling member, and configured for supporting the tyre in laying relation at an axially outer edge thereof.

8. The apparatus as claimed in claim 7, wherein the circumferential support and the profiling member are reciprocally positionable along a direction parallel to the central geometric axis ("Y").

9. The apparatus as claimed in claim 8, wherein the circumferential support comprises:
    a support ring slidably engaged with respect to the centring mandrel along the central geometric axis ("Y"); and
    elastically movable sheets fixed to the support ring and circumferentially distributed around the central geometric axis ("Y") configured for defining the circumferential supporting surface.

10. The apparatus as claimed in claim 9, wherein the sheets are spaced apart from the central geometric axis ("Y")

by a greater extent than a maximum radius of the profiling member with respect to the central geometric axis ("Y") itself.

11. The apparatus as claimed in claim 9, wherein each sheet comprises an attachment portion fixed to the support ring and extending away from the latter parallel to the central geometric axis ("Y"), and a supporting portion extending transversely from one end of the attachment portion.

12. The apparatus as claimed in claim 1, wherein the transfer member comprises a driving group with a gripping device and the gripping device comprises gripping elements circumferentially distributed around a gripping axis ("Z").

13. The apparatus as claimed in claim 12, wherein the gripping device comprises a tailstock coaxial to the gripping axis ("Z") and engageable in shape coupling with a coupling shank.

14. The apparatus as claimed in claim 12, wherein the gripping elements comprise suction members activated to exert a pneumatic suction action against the green tyre engaged on the centring mandrel.

\* \* \* \* \*